United States Patent [19]
Nilsen et al.

[11] Patent Number: 5,593,593
[45] Date of Patent: Jan. 14, 1997

[54] PROCESS FOR REMOVING SULFATE ANIONS FROM WASTE WATER

[75] Inventors: David N. Nilsen, Lebanon; Gloria J. Galvan, Albany; Gary L. Hundley, Corvallis; John B. Wright, Albany, all of Oreg.

[73] Assignee: United States of America, Washington, D.C.

[21] Appl. No.: 424,852

[22] Filed: Apr. 19, 1995

[51] Int. Cl.$^6$ ................................................. B01D 61/40
[52] U.S. Cl. .......................... 210/638; 210/643; 210/748
[58] Field of Search ...................... 210/638, 643, 210/644, 698, 748

[56] References Cited

U.S. PATENT DOCUMENTS 5,190,656  3/1993  Paul et al. ................................ 210/643

Primary Examiner—Frank Spear
Attorney, Agent, or Firm—E. Philip Koltos; Albert A. Kashinski; William R. Moser

[57] ABSTRACT

A liquid emulsion membrane process for removing sulfate anions from waste water is disclosed. The liquid emulsion membrane process includes the steps of: (a) providing a liquid emulsion formed from an aqueous strip solution and an organic phase that contains an extractant capable of removing sulfate anions from waste water; (b) dispersing the liquid emulsion in globule form into a quantity of waste water containing sulfate anions to allow the organic phase in each globule of the emulsion to extract and absorb sulfate anions from the waste water and (c) separating the emulsion including its organic phase and absorbed sulfate anions from the waste water to provide waste water containing substantially no sulfate anions.

5 Claims, 1 Drawing Sheet

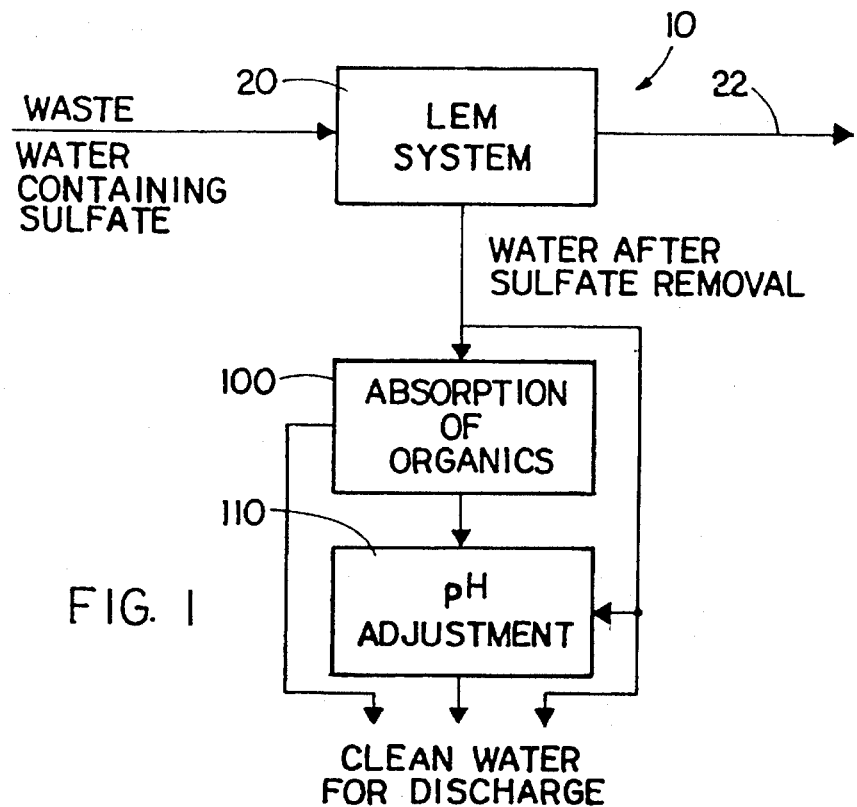
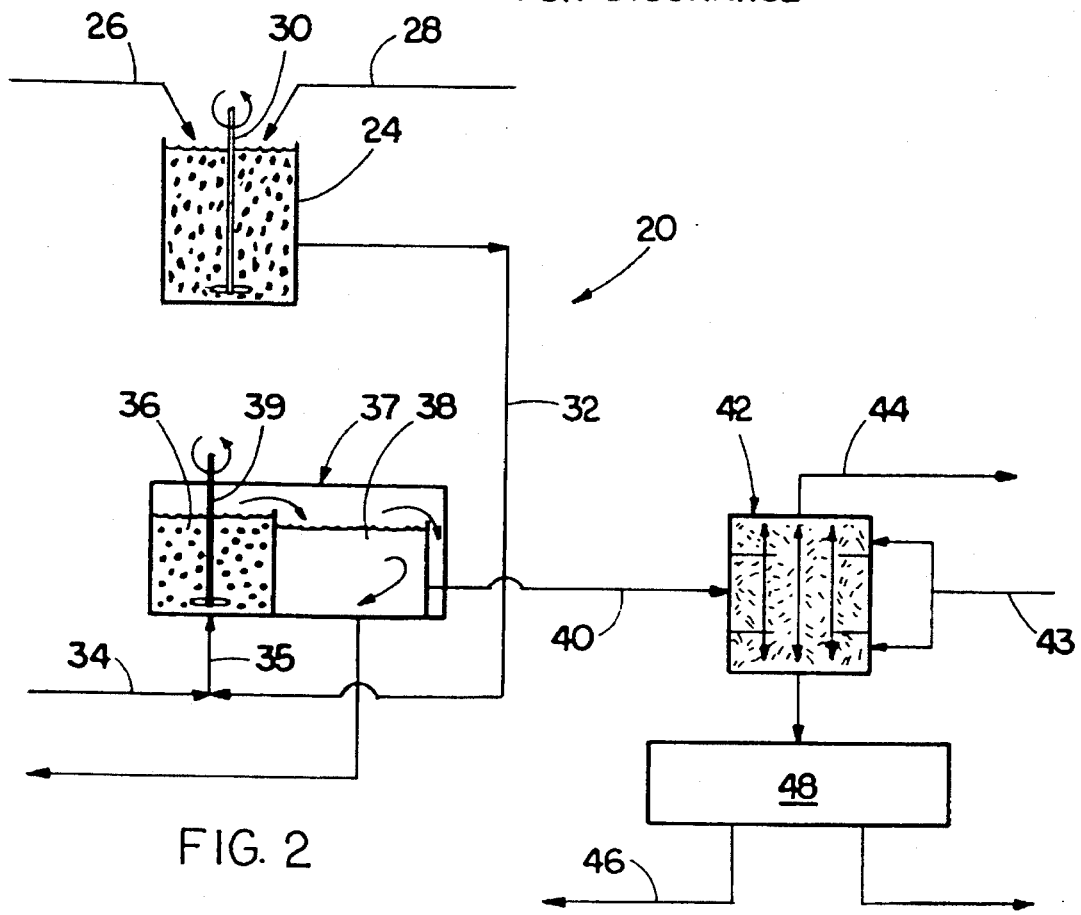

PROCESS FOR REMOVING SULFATE ANIONS FROM WASTE WATER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to a process for removing sulfate anions from sulfate-contaminated waste water and, more particularly, to a process for removing sulfate anions from sulfate-contaminated waste water utilizing liquid emulsion membranes.

2. Description of the Prior Art

It is well recognized that a process for removing sulfate in anion form from waste water would be very beneficial to both the environmental and business interests of this country. Presently, thousands of sites on federal and private lands contain sulfate-contaminated water. For example, acid mine drainage (AMD) from many active and inactive mines produce low-pH water that contains sulfate levels higher than discharge standards such as the Environmental Protection Agency Drinking Water Standards.

Processes do presently exist for removing sulfate in anion form from solutions. However, most of these known and proposed processes involve the precipitation of a compound containing the sulfate anion that itself has a low solubility in water. Examples of this process utilize calcium and barium compounds. Unfortunately, the solubility of calcium sulfate in many waste waters results in a level of sulfate that is above that allowed in the Environmental Protection Agency's (EPA's) current Drinking Water Standards, which is 0.25 g/L $SO_4$. Barium, on the other hand, is capable of reducing the level of sulfate to very low levels. However, most barium-containing compounds are known to be very toxic. Therefore, the use of calcium and barium in "general" waste water treatment approaches has been considered by those skilled in the art to be risky. In addition, most barium-containing compounds capable of being used in a sulfate removal process are considered to be overly expensive and therefore not desired for use in a commercial process of sulfate removal.

A more recent technique that has been proposed for use as a sulfate reducer in waste water treatment uses sulfate reducing bacteria. In general, this process uses bacteria that have the ability to break down sulfate through their biological activity into compounds such as hydrogen sulfide. Some studies have indicated that this technique may be relatively expensive and some data indicates that it may not be effective enough in some situations to meet the EPA's discharge standards. Another concern with this process is that hydrogen sulfide gas is generated as a product of the sulfate reduction. Since this is a toxic gas which must be captured for use or storage, special considerations must be given to the design and operation of waste water plants using this technique. This requirement will obviously add to the capital and operating costs of the process, and will also unduly complicate the safety aspects of the operation. One of the proposed uses of the hydrogen sulfide gas generated during this process is the precipitation of metals from the waste water. However, this adds an additional potential complication to the process because the required amount of hydrogen sulfide for metal precipitation may not be matched by the production from the sulfate reduction process.

Solid membrane techniques such as reverse osmosis (RO) have also been proposed for use in the general treatment of waste water. However, in its application to sulfate removal from waste waters, the RO process will produce two streams. One stream is a relatively concentrated solution containing most of the sulfate and the other stream is a relatively pure solution. The partially concentrated sulfate solution will require further processing (concentration) before the sulfate can be disposed of. In addition, the RO technique is relatively non-specific. Therefore, essentially all of the impurities contained in the original waste water will stay in the resulting concentrated stream with the sulfate. These other impurities may make the final sulfate material more toxic, and thus more difficult to dispose of. Other disadvantages of the RO process in this application are that fouling of the membrane with solids is likely when treating acid mine drainage waters. In many mine drainage water treatment situations, the water will first be treated with lime to precipitate out most of the contained metals, such as iron. Thus, the waters to be treated subsequently for sulfate removal will be saturated with calcium sulfate which tends to continue to precipitate-out of solution for extended periods of time. Additionally, solid membrane techniques like RO are relatively expensive approaches for the treatment of waste waters such as acid mine drainage waters which in many cases amounts to very large flow rates.

As seen from the foregoing, although different processes have been considered for removing sulfate from waste water streams they are not without their shortcomings. Consequently, there is a need for an improved process for removing sulfates in anion form from waste water streams which can easily reduce the level of sulfate in the waste water to levels well below the EPA's Drinking Water Standards. The process must be not only effective in reducing the level of sulfate in the waste water to an environmentally acceptable level, but in addition the process must avoid the use of, or production of, highly toxic materials during process implementation. Finally, the process must be capable of operating without adding any extraneous materials to the waste water that would adversely effect water quality.

SUMMARY OF THE INVENTION

The present invention relates to a liquid emulsion membrane process for removing sulfate anions from waste water streams designed to satisfy the aforementioned needs. The process of the present invention is a relatively inexpensive and simple process to implement. In addition, the process of the present invention is benign from the standpoint that it does not use or produce any highly toxic materials during process implementation. Finally, the process of the present invention does not add any extraneous materials to the waste water being treated that would otherwise adversely effect water quality after the process has been completed.

Accordingly, the present invention is directed to a process for removing sulfate anions from waste water utilizing liquid emulsion membranes. The process includes the steps of: (a) providing a liquid emulsion formed from an aqueous strip solution and an organic phase that contains an extractant capable of removing sulfate anions from waste water; (b) dispersing the liquid emulsion in globule form into a quantity of waste water containing sulfate anions to allow the organic phase in each globule of the emulsion to extract and absorb sulfate anions from the waste water; and (c) separating the emulsion including its organic phase and absorbed sulfate anions from the waste water to provide waste water containing substantially no sulfate anions.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a flow diagram which generally illustrates the liquid emulsion membrane process of the present invention operable to remove sulfate anions from waste water streams and a pair of optional follow-on processes for removing organics and adjusting the pH of the waste water after sulfate anion removal; and FIG. 2 is a schematic diagram illustrating in detail the liquid emulsion membrane process of the present invention for removing sulfate anions from waste water streams.

DETAILED DESCRIPTION OF THE INVENTION

The present invention is directed to a process for removing sulfate anions from waste water streams. Generally speaking, the sulfate removal process of the present invention includes one main process and two optional, secondary processes that may be included in the overall process depending on the situation. The process for removing sulfate anions from waste water and the two optional secondary processes that may be included to create what shall be referred to herein as the "overall" process for treating waste water illustrated in flow diagram form in FIG. 1 and generally designated by the numeral 10. As seen FIG. 1, the overall process 10 for treating waste water includes a liquid emulsion membrane process 20 operable to remove sulfate anions from a waste water stream, an optional organic removal process 100 and an optional pH-adjustment process 110. In the overall process 10, waste water containing sulfate is first passed through the liquid emulsion membrane (LEM) process or system 20 where sulfate anions are removed from the waste water. If no further treatment of the substantially sulfate-free waste water is desired, the treated water is discharged from the LEM system 20 at discharge line 22 for its intended use. However, if after sulfate anion removal it is desired to further treat the waste water passed through the LEM system 20, the waste water may be subjected to the organic removal process 100, the pH-adjustment process 110 or a combination of the organic removal process 100 and the pH-adjustment process 110.

As will be described in greater detail herein the LEM process or system 20 uses liquid emulsion membranes or LEMs that are specifically designed for this application to extract sulfate anions from the waste water stream and concentrate the sulfate anions into an internal or aqueous strip solution. During the sulfate anion extraction process, a counter ion is transferred from the aqueous strip solution to the waste water. As will be described herein, it is desirable to choose a benign counter ion such as anions of carbonate or hydroxyl. However, other counter anions such as phosphate may also be used. If it is desired to remove organics from the waste water stream after it has been processed in the LEM system 20, the waste water stream is subjected to the organic removal process 100 which utilizes a device containing material such as charcoal to absorb much of the small amount of organic material that is imparted to the waste water stream during the sulfate anion removal phase. In this way, the discharged water is not contaminated by organic phase from the LEM process 20. During the sulfate extraction process 20, if counter ions such as carbonate or hydroxyl are used, the pH of the resulting waste water is often increased. In cases where it is desirable to produce an effluent waste water with a near neutral pH level, the pH adjustment process 110 is included in the overall process 10. Many different pH-adjusting agents may be used. However, in the treatment of waste water streams such as acid mine discharge water streams and other waste water streams where discharge standards are to be met (such as the EPA's Drinking Water Standards), the preferred neutralizer is carbon dioxide gas or similar agents that result in the generation of compounds related to carbonic acid in the water. As seen, subjecting the waste water passed through the LEM process 20 to the pH-adjustment process 110 reduces the pH of the water to the neutral level without the addition of regulated (toxic) substances.

Now referring to FIG. 2, there is presented a detailed schematic illustration of the liquid emulsion membrane (LEM) process 20 of the present invention. The LEM process 20 is specifically designed to remove sulfate anions from waste water streams. Unsupported LEMs are made by forming in a container 24 an emulsion from two immiscible phases. The two immiscible phases include an aqueous phase internal or strip solution introduced into the container 24 at input line 26 and an organic phase extractant/surfactant-diluent introduced into the container 24 at input line 28. Within the container 24 the aqueous phase internal or strip solution and the organic phase extractant/surfactant-diluent are mixed by rotation of a stirring device 30. The emulsion is made within the container 24 by emulsifying the aqueous strip solution into the organic phase that contains the extractant for the sulfate ions and a surfactant that is used to stabilize the resultant emulsion. The aqueous strip solution contains counter ions such as carbonate or hydroxyl. The emulsion formed in the container 24 is thereafter passed through the line 32 and dispersed in small globule form into the sulfate anion-laden waste water stream passing through line 34. The mixture of sulfate anion-laden waste water and small globules of emulsion are introduced into an extraction chamber portion 36 of a vessel 37 via input line 35. The sulfate anions present in the waste water are extracted by the emulsion globules as the waste water and emulsion globules are mixed in the extraction chamber portion 36 of the vessel 37 by a stirrer 39. Within the emulsion globules, the extracted sulfate anions transfer from the organic phase to the aqueous strip solution. The stripping agent within the aqueous strip solution (carbonate, hydroxyl, or other anions) replace the sulfate anions from the extractant, resulting in regeneration of the extractant while transferring and concentrating the sulfate anions into the aqueous strip solution. The end result is the transfer of sulfate anions from the waste water into the aqueous strip solution and the counter transfer of benign stripping anions such as carbonate or hydroxyl into the waste water.

The sulfate-loaded emulsion is separated from the waste water in a settler portion 38 of the vessel 37. The waste water is then discharged from the LEM system for use or for further treatment via the organic removal process 100 or the pH adjustment process described with respect to FIG. 1. The sulfate-loaded emulsion from the settler portion 38 of the vessel 37 is passed through line 40 to an electrical coalescer 42. In the electrical coalescer 42, a high voltage electrical field is applied to the sulfate-loaded emulsion via high voltage input 43 resulting in the breakage of the emulsion and the recovery of the organic phase and the internal or aqueous strip solution that now contains the extracted sulfate anions. Although not specifically shown in FIG. 2, the recovered organic phase passing through line 44 is eventually introduced into line 28 and is recycled back to the container 24 for more emulsion making and sulfate extraction. The recovered aqueous strip solution may be partially recycled via line 46 back to line 26 and into the container 24 for more emulsion making and sulfate extraction with a portion of the recovered aqueous strip solution being removed and passed through a sulfate-salt production unit 48 wherein sulfate containing salts are removed from the aqueous strip solution. Another available option is to pass all of the recovered aqueous strip solution through the sulfate-salt production unit 48 and use fresh aqueous strip solution for further emulsion making and sulfate extraction. The sulfate-salt production unit 48 is used to recover the extracted sulfate in a form that is convenient to either dispose of or use as a by-product. Various methods may be used for the sulfate-salt production unit, such as evaporation/crystallization and/or precipitation.

The preferred extractant used in the organic phase may be drawn from the amine and/or organo phosphorus classes of organic extractants. An example is the quaternary salts such as Aliquat 336. The surfactant may be drawn from the cation, anionic, and nonionic classes. However, the preferred surfactant compounds are drawn from groups related to organic polyamines and/or copolymers such as maleic anhydride/1-octadecene. The preferred surfactants are in the nonionic class such as Paranox 100. The bulk of the organic phase is made up of kerosenes, primarily aliphatic kerosenes such as Isopar L, M, V and/or similar compounds. However, any appropriate kerosene may be used. The preferred extractant and surfactant concentrations in the organic phase are about 5 wt pct and 1 wt pct, respectively. However, concentrations from about 1 wt pct up to 50 wt pct extractant and 0.25 wt pct up to 20 wt pct surfactant may be used. The preferred concentration of counter ion in the internal solution is about 1.5 M sodium carbonate and/or sodium hydroxide. However, concentrations from about 0.5 M up to about 5 M may be used. The electrical coalescer may use voltages of from about 1000 Volts AC up to 20,000 Volts AC at frequencies from 50 cycles to 10,000 cycles to break the emulsion. However, the preferred parameters for the electrical coalescer are about 5,000 to 6,000 Volts AC at 60 cycles. Temperature is not a critical parameter and ambient temperatures from about 1 degree centigrade to about 50 degrees centigrade are acceptable.

Again referring to FIG. 1, the optional organic removal process 100 operable to absorb organics from the waste water stream after treatment in the LEM system utilizes absorbents which contact the waste water stream. Absorbents such as charcoal may be used for organics removal by placing the charcoal in a mixing tank or column and passing the waste water stream through the mixing tank or column. For this process, the preferred organic absorbent has been found to be activated coconut charcoal with a mesh size from about 8 to 30.

The optional pH-adjustment process 110 operable to reduce the pH of the waste water after treatment in the LEM system 20 may utilize many different pH-lowering agents. For this process, the preferred pH-reducing agent has been found to be carbon dioxide gas sparged into the waste water. This results in lowering the waste water's pH to the desired level. Any suitable sparging device such as a tank, pipeline mixer or column may be used with acceptable results.

EXAMPLE

The objective of the test conducted was to reduce the sulfate level in a typical acid mine drainage (AMD) sample to the Drinking Water Standard of 0.25 g/L $SO_4$. Typical AMD water from an abandoned, hard-rock mineral mine was used in the test. The AMD water initially contained 5.23 g/L $SO_4$ and had a pH of 2.3. The first step of the process was to remove most of the metals from the water. The objective was to produce a water for LEM research that was fairly typical of waters treated by conventional technology (e.g.-lime precipitation or similar known technologies). No attempt was made to optimize the precipitation step. In this case, the pH of the AMD water was raised to about 8. Most of the metals contained in the AMD water were precipitated and the sulfate level was reduced, but it was still too high (2.42 g/L $SO_4$) to meet acceptable drinking water standards. In this test, calcium carbonate was used as the neutralizer to adjust the pH and to precipitate most of the metals out of the water.

This solution was treated by the LEM process 20 as described herein in a single, batch, contact. The LEM had an internal solution containing sodium carbonate (1.5 M), and carbonate anions were exchanged for the sulfate anions in the AMD water. The LEM technique reduced the sulfate level to about 0.06 g/L in a 15 minute contact. In the process of extracting sulfate, the sulfate level in the internal solution increased by 22.8 g/L. The objective was to recycle the internal solution and to build up the sulfate level in that solution to high levels before taking a bleed stream for production of a sulfate-containing material in a sulfate-salt production unit such as the unit 48 shown in FIG. 2. During operation of the LEM process, the pH rose to about 10 in response to the transfer of carbonate anions to the water.

The next step involved sparging carbon dioxide into the water to reduce the pH to the discharge limits. In this case, the pH was lowered to about 6.5. There are no limits on carbonate in the Drinking Water Standards. For the most part, carbonate is considered to be a benign compound in water. In a related test, AMD water after sulfate removal via the LEM process 20 was contacted with powdered activated coconut charcoal in a mixing vessel. The total organic content of the water was reduced from about 24 parts per million to about 1 part per million during a 30 minute contact.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. A liquid emulsion membrane process for removing sulfate anions from waste water, comprising the steps of:
   (a) providing a liquid emulsion formed from an aqueous strip solution and an organic phase that contains an extractant capable of removing sulfate anions from waste water;
   (b) dispersing said liquid emulsion in globule form into a quantity of waste water containing sulfate anions to allow the organic phase in each globule of said liquid emulsion to extract and absorb sulfate anions from said waste water, said dispersing including
  (i) transferring the extracted sulfate anions absorbed by the organic phase of each globule of said liquid emulsion to the aqueous strip solution; and
  (ii) transferring a stripping agent within the aqueous strip solution to the organic phase to replace the previously transferred extracted sulfate anions and thereby regenerate the extractant in said organic phase and concentrate all of the sulfate anions removed from the waste water in said aqueous strip solution;
(c) after dispersing, applying a high voltage electrical field to said liquid emulsion to break down said liquid emulsion and recover the organic phase and the aqueous strip solution containing said extracted sulfate anions; and
(d) separating the emulsion including its organic phase and absorbed sulfate anions from said waste water to provide waste water containing substantially no sulfate anions.

2. The liquid emulsion membrane process as recited in claim 1, wherein the organic phase recovered as a result of the application of said high voltage electrical field to said liquid emulsion is recycled for further emulsion making and sulfate extraction.

3. The liquid emulsion membrane process as recited in claim 1, wherein at least a portion of the aqueous strip solution recovered as a result of the application of said high voltage electrical field to said liquid emulsion is subjected to a sulfate-salt producing process capable of removing substantially all of the sulfate anions from the aqueous strip solution so that, upon sulfate anion removal, the aqueous strip solution may be recycled for further emulsion making and sulfate extraction.

4. The liquid emulsion membrane process as recited in claim 3, wherein said sulfate-salt producing process is one of an evaporation, crystallization and precipitation process.

5. The liquid emulsion membrane process as recited in claim 1, wherein said high voltage electric field is preferably between 5,000 and 6,000 Volts AC at a frequency of 60 cycles.

* * * * *